United States Patent
Kim et al.

(10) Patent No.: US 9,690,350 B2
(45) Date of Patent: Jun. 27, 2017

(54) METHOD AND APPARATUS FOR POWER REDUCTION DURING LANE DIVERGENCE

(75) Inventors: Nam Sung Kim, Middleton, WI (US);
James M. O'Connor, Austin, TX (US);
Michael J. Schulte, Austin, TX (US);
Vijay Janapa Reddi, Austin, TX (US)

(73) Assignee: Advances Micro Devices, Inc., Sunnyvale, CA (US)

( * ) Notice: Subject to any disclaimer, the term of this patent is extended or adjusted under 35 U.S.C. 154(b) by 224 days.

(21) Appl. No.: 13/605,460

(22) Filed: Sep. 6, 2012

(65) Prior Publication Data
US 2014/0068304 A1  Mar. 6, 2014

(51) Int. Cl.
*G06F 1/00* (2006.01)
*G06F 1/32* (2006.01)
*G06F 9/30* (2006.01)
*G06F 9/38* (2006.01)

(52) U.S. Cl.
CPC .......... *G06F 1/3203* (2013.01); *G06F 1/3237* (2013.01); *G06F 1/3287* (2013.01); *G06F 9/30083* (2013.01); *G06F 9/3851* (2013.01); *G06F 9/3887* (2013.01); *Y02B 60/1221* (2013.01); *Y02B 60/1282* (2013.01); *Y02B 60/32* (2013.01)

(58) Field of Classification Search
CPC .................................. G06F 1/32; G06F 1/3203
USPC ......................................................... 713/323
See application file for complete search history.

(56) References Cited

U.S. PATENT DOCUMENTS

2006/0155964 A1* 7/2006 Totsuka .............. G06F 9/30101
712/214

OTHER PUBLICATIONS

MIT, CMOS Technology and Logic Gates, Feb. 7, 2005, http://ocw.mit.edu/courses/electrical-engineering-and-computer-science/6-884-complex-digital-systems-spring-2005/lecture-notes/I03_cmos_gates.pdf, p. 31.*
S. Manne, et al. "Pipeline Gating: Speculation Control for Energy Reduction" in Proc of ISCA 1998.
R. M. Rao et al. "A Heuristic to Determine Low Leakage Sleep State Vectors for CMOS Combinational Circuits" in Proc ICCAD, 2003.
Akkary, H.; Srinivasan, S.T.; Koltur, R.; Patil, Y.; Refaai, W., "Perceptron-Based Branch Confidence Estimation," Software, IEE Proceedings- , vol., No., pp. 265,265, Feb. 14-18, 2004 doi: 10.1109/HPCA.2004.10002 URL: http://ieeexplore.ieee.org/stamp/stamp.jsp? tp=&arnumber=1410083&isnumber=30563.
Chao-Yang Chang; Pai-Cheng Iso; Chung-Hsun Huang; Po-Hui Yang, "A fast wake-up power gating technique with inducing a balanced rush current," Circuits and Systems (ISCAS), 2012 IEEE International Symposium on , vol., No., pp. 3086,3089, May 20-23, 2012 doi: 10.1109/ISCAS.2012.6271972 URL: http://ieeexplore.ieee.org.proxy.libraries.rutgers.edu/stamp/stamp.jsp?.

* cited by examiner

Primary Examiner — Jaweed A Abbaszadeh
Assistant Examiner — Austin Hicks
(74) Attorney, Agent, or Firm — Volpe and Koenig, P.C.

(57) ABSTRACT

A method and device for reducing power during an instruction lane divergence includes idling an inactive execution lane during the lane divergence.

27 Claims, 3 Drawing Sheets

METHOD AND APPARATUS FOR POWER REDUCTION DURING LANE DIVERGENCE

FIELD OF THE INVENTION

The present invention is generally directed to power reduction, and in particular to power reduction during lane divergence.

BACKGROUND

Graphics Processing Units (GPUs) are becoming increasingly more complex. In particular, compared to traditional data parallel applications suited to a GPU, newer general-purpose GPU (GPGPU) applications have less regular memory access patterns and execute more branch instructions that control the flow of computations based on specific conditions.

GPGPUs sequentially execute threads that diverge at a branch instruction. Accordingly, while one group of threads of an instruction is executed on a branch, another group on the divergent path awaits execution until the first group converges with it at a safe point. Similarly, when accessing memory, execution lanes in the GPU may have divergent execution paths based on when data is available from memory.

In these lane divergence situations, all execution lanes cannot be fully utilized simultaneously. However, those unused execution lanes continue to be active and consume power, such as clocking and leakage power, during the time of execution for threads that are on another lane.

SUMMARY OF EMBODIMENTS

An embodiment directed to a method for reducing power during an instruction lane divergence is disclosed. The method includes idling an inactive execution lane during the lane divergence.

A further embodiment directed to a method for reducing power during an instruction lane divergence is also disclosed. The method includes determining whether to idle an inactive execution lane during the lane divergence, and idling the inactive execution lane based upon the determination.

A further embodiment of aspects of the invention directed to an apparatus is disclosed. The apparatus includes circuitry configured to idle an inactive execution lane during an instruction lane divergence.

A further embodiment of aspects of the invention directed to a non-transitory computer-readable storage medium is disclosed. The non-transitory computer-readable storage medium contains a first set of instructions, which when executed by a processor allow the processor to idle an inactive execution lane during an instruction lane divergence.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

A method and apparatus for power reduction during lane divergence utilizes idling execution lanes that are not used, (i.e., idle), during lane divergence.

Figure 1:
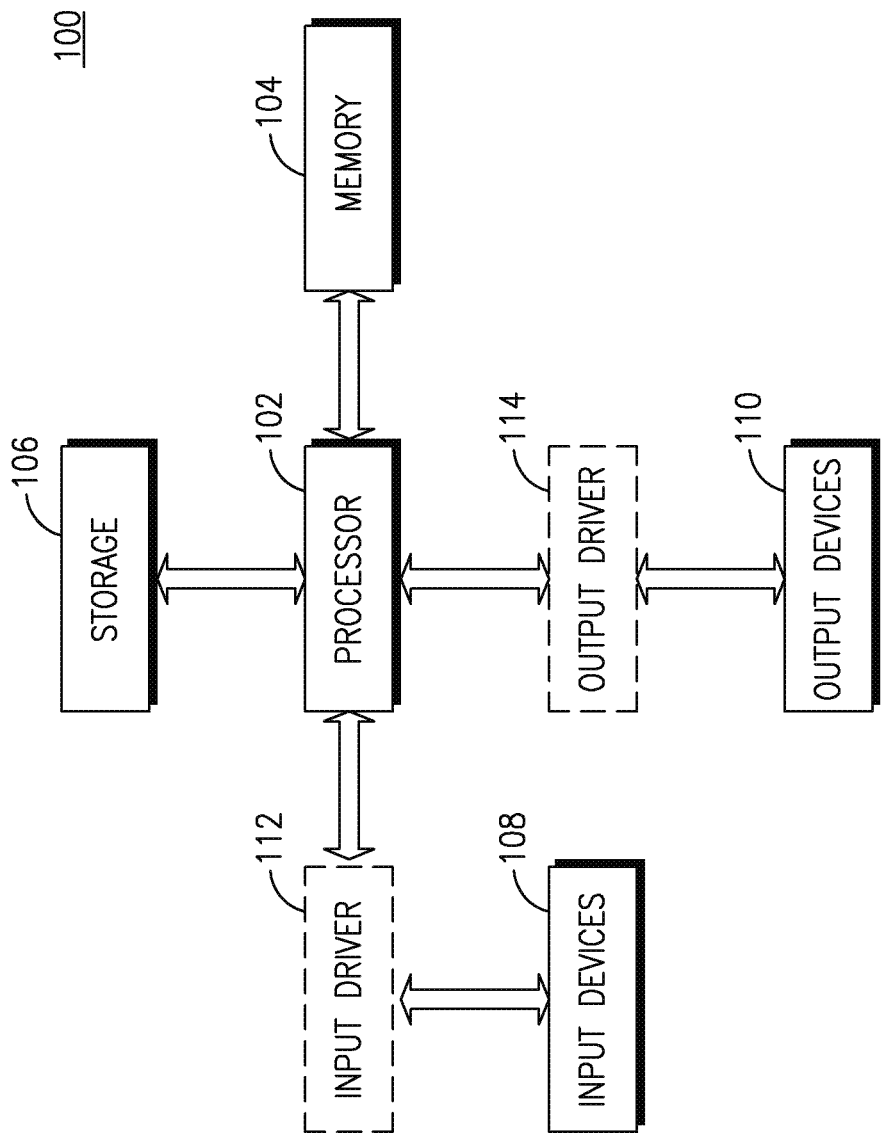
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
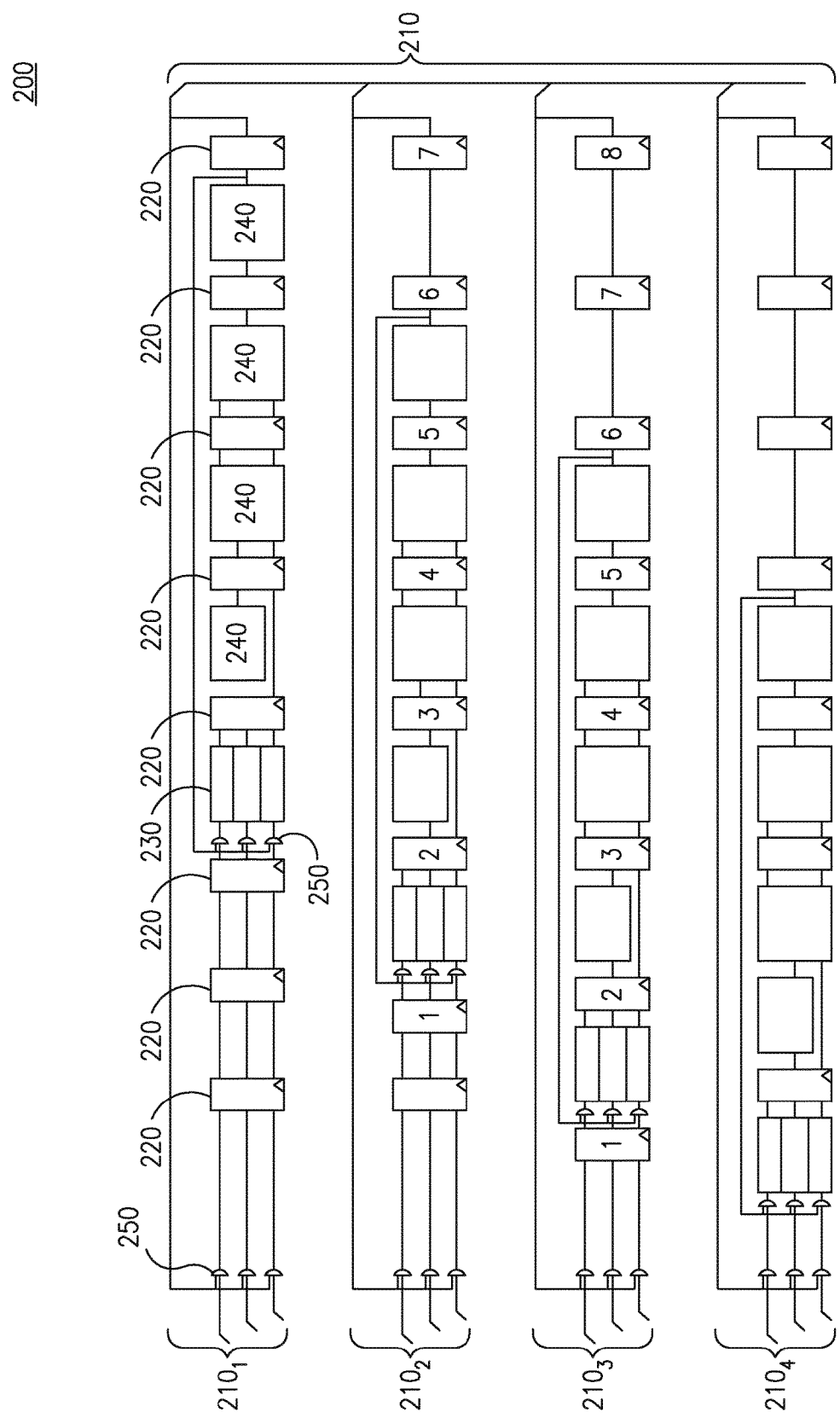
FIG. 2 is an example functional block diagram of execution lane circuitry of an embodiment.

FIG. 2 is an example functional block diagram of execution lane circuitry 200 of an embodiment. The execution lane circuitry 200 may be included within a processor such as processor 102 and the execution lane circuitry 200 includes a plurality of execution lanes 210, (designated $210_1$, $210_2$, $210_3$, and $210_4$). Each execution lane 210 includes flops 220, and functional circuitry 230, 240 and 250. Functional circuitry 230 may include, for example, P-metal oxide semiconductor (PMOS) or N-metal oxide semiconductor (NMOS) devices. Functional circuitry 240 may include, for example, multipliers, aligners, adders, or normalizers. Functional circuitry 250 may include, for example, logic AND gates. It should be noted that although 4 execution lanes are shown for purposes of example, any number of execution lanes may be included in a processor such as processor 102. Additionally, although various functional components are described for purposes of example on each execution lane 210, it should be understood that additional, or less, components may be included. Additionally, circuit 200 may be a single-instruction-multiple-data (SIMD) circuit.

Although a more detailed explanation will be provided below, FIG. 2 shows four execution lanes 210 where a lane divergence occurs. In the example shown in FIG. 2, lanes $210_1$ and $210_4$ are active lanes, while execution lanes $210_2$ and $210_3$ are inactive. Accordingly, lanes $210_2$ and $210_3$ may be idled and powered down to conserve energy.

Figure 3:
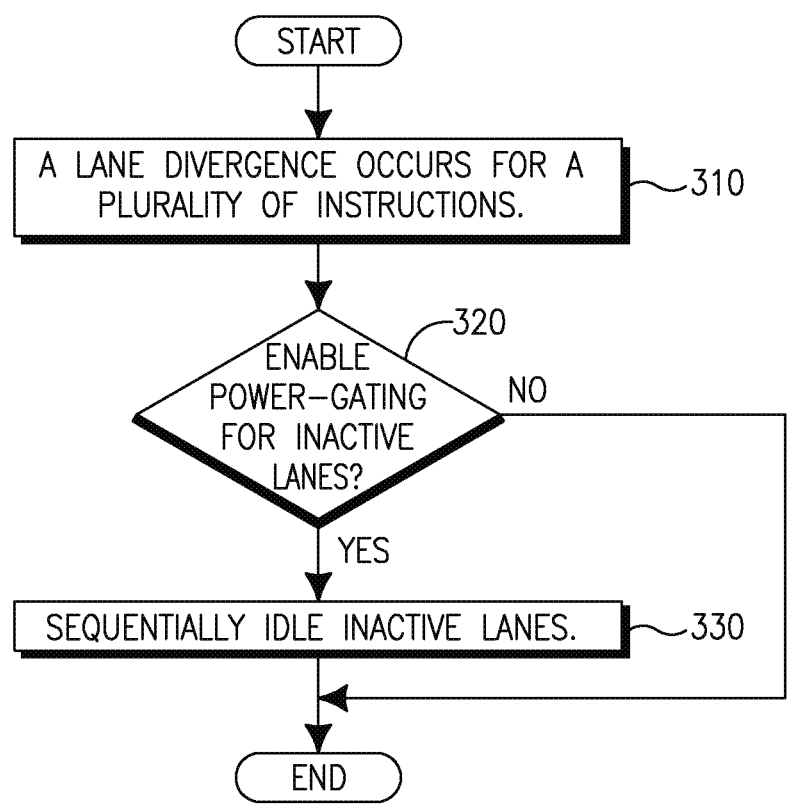
FIG. 3 is a flow diagram of an example method for power reduction during lane divergence.

FIG. 3 is a flow diagram of an example method 300 for power reduction during lane divergence. In step 310, a lane divergence occurs for a plurality of instructions. For example, referring back to FIG. 2, two threads are executed on execution lanes $210_1$ and $210_4$ while execution lanes $210_2$ and $210_3$ are inactive as mentioned above.

Once a lane divergence is to occur, it is determined whether or not to enable power-gating for inactive execution lanes (step 320). For example, the lane divergence may be detected in the branch instructions at a decoding stage or by a compiler such as a Shader compiler. The compiler may statically analyze the code along a divergent branch path and make the determination as to whether or not power-gating inactive execution lanes should occur.

For example, where the number of instructions executed along a divergent path is small, then it may be desirable not to enable power-gating of the inactive execution lanes. In a memory retrieval scenario, this may occur where a retrieval does not require the data to extracted from a distant memory device. However, should it be determined in step 320 to enable power-gating, then the higher-level intelligence of the compiler may be configured to be aware of the number of instructions and their latency through the execution pipeline along any of the control flow paths. Accordingly, the compiler may make the determination as to whether or not inactive execution lanes should be power-gating and may signal the information to the circuit 200 via, for example, bit encodings in the instructions set architecture. That is, the encodings may be utilized to set an "idle" bit, for example, that is transmitted through the execution pipeline to indicate the execution lanes 210 that should be rendered inactive.

If it is determined in step 320 to idle inactive execution lanes, then the execution lanes 210 that are inactive during the branch divergence are idled (step 330). The idling may be accomplished by implementing a sleep vector technique or by clock-gating. Additionally, to minimize potential di/dt noise and to ensure all in-flight instructions in the execution pipeline complete their executions, the application of sleep vectors or clock-gating may be performed in a staggered manner.

For example, again referring back to FIG. 2, flops 220 may be idled in sequential order on execution lines $210_2$ and $210_3$ in the sequence 1-7 and 1-8, respectively. Additionally, flops 220 may be idled sequentially in groups. Referring to execution line $210_2$, for example, flops 220 (1 and 2) may be idled, then flops 220 (3 and 4), then flops 220 (5 and 6), and finally flop 220 (7). It should be noted that any other grouping of flops 220 may also be utilized for sequential idling.

Once the divergent branch instruction paths resolve at their convergence point, the execution lanes 210 that were idled may be re-enabled in the same order that they were idled. The same sequential re-enabling of flops 220 may be implemented as was utilized to idle them in this case. However, other mechanisms for re-enabling flops 220 may be utilized.

For example, several cycles before the end of a code block, an instruction, or hardware predictor, may indicate that the end of the block is approaching, and that inactive execution lanes should be re-enabled. Accordingly, the inactive execution lanes can be powered up and available for execution when needed. This may be accomplished via use of a distinct opcode, such as a "wakelanes" instruction that enables any inactive execution lanes that will be needed within a few instructions. All inactive lanes could be re-enable, only the lanes on the branch divergence call stack that are to be re-enabled shortly may be activated, or a lane enable bitmask parameter may be taken by the opcode. Alternatively, a bit may be included on all opcodes that has the effect of waking the inactive execution lanes or the execution lanes in the branch divergence stack. A hardware predictor structure may also be utilized that learns which program counters (PCs) are several cycles before the end of a code block that requires execution lanes to be re-enabled.

It should be understood that many variations are possible based on the disclosure herein. Although features and elements are described above in particular combinations, each feature or element may be used alone without the other features and elements or in various combinations with or without other features and elements.

For example, although the method above has been described in the context of GPUs, it may be applicable to other forms of processing that use per-lane predication.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for reducing power during an instruction lane divergence, comprising:
   controlling, by control circuitry, a plurality of execution lane circuits, wherein each execution lane includes one or more flops and one or more functional circuitry components in communication with the one or more flops;
   selectively idling, by the control circuitry, the one or more functional circuitry components of an inactive execution lane circuit during the lane divergence, wherein the selectively idling the one or more functional circuitry components of the execution lane circuit includes sequentially idling circuit components in the inactive execution lane circuit; and power-gating, by the control circuitry, the selectively idled one or more functional circuitry components, wherein the power-gating is based upon either one of the following:

whether a number of instructions executed along a divergent path exceeds a predetermined threshold, or whether a time delay for extracting data from memory exceeds a predetermined threshold.

2. The method of claim 1 wherein selectively idling the one or more functional circuitry components of the inactive execution lane circuit includes applying a sleep vector to the inactive execution lane circuit.

3. The method of claim 1 wherein the sequential idling includes sequentially idling groups of components in the inactive execution lane circuit.

4. The method of claim 2, further comprising re-enabling the one or more functional circuitry components of the inactive execution lane circuit upon the divergent instruction reconverging at a convergence point.

5. The method of claim 4 wherein the re-enabling of the one or more functional circuitry components of the inactive execution lane circuit includes sequentially re-enabling circuit components in the inactive execution lane circuit.

6. The method of claim 5 wherein the sequential re-enabling includes sequentially re-enabling groups of components in the inactive execution lane circuit.

7. The method according to claim 1, wherein the one or more functional circuitry components include at least one of a P-Metal oxide semiconductor (PMOS) device or an N-Metal oxide semiconductor (NMOS) device.

8. The method according to claim 1, where the one or more functional circuitry components include logic gates.

9. The method of claim 1 wherein the one or more functional circuitry components of the inactive execution lane circuit are selectively idled if the number of instructions executed along the divergent path exceeds the predetermined threshold.

10. The method of claim 1 wherein the one or more functional circuitry components of the inactive execution lane circuit are selectively idled if the time delay exceeds the predetermined threshold.

11. An apparatus, comprising:

a plurality of execution lane circuits, wherein each execution lane includes one or more flops and one or more functional circuitry components in communication with the one or more flops; and control circuitry in communication with the one or more functional circuitry components, wherein the control circuitry is configured to:

selectively idle the one or more functional circuitry components of an inactive execution lane during an instruction lane divergence, wherein the control circuitry is further configured to sequentially idle the one or more functional circuitry components in the inactive execution lane; and power-gate the selectively idled one or more functional circuitry components based upon either one of the following:

whether a number of instructions executed along a divergent path exceeds a predetermined threshold, or whether a time delay for extracting data from memory exceeds a predetermined threshold.

12. The apparatus of claim 11 wherein the control circuitry is further configured to apply a sleep vector to the inactive execution lane.

13. The apparatus of claim 11 wherein the control circuitry is further configured to sequentially idle groups of components in the inactive execution lane.

14. The apparatus of claim 11 wherein the control circuitry is further configured to re-enable the one or more functional circuitry components of the inactive execution lane upon the divergent instruction reconverging at a convergence point.

15. The apparatus of claim 11 wherein the control circuitry is further configured to sequentially re-enable circuit components in the inactive execution lane upon the divergent instruction reconverging at a convergence point.

16. The apparatus of claim 11 wherein the control circuitry is further configured to sequentially re-enable groups of components in the inactive execution lane upon the divergent instruction reconverging at a convergence point.

17. The apparatus of claim 11, wherein the apparatus is implemented in an integrated circuit (IC).

18. The apparatus according to claim 11, wherein the one or more functional circuitry components include at least one of a P-Metal oxide semiconductor (PMOS) device or an N-Metal oxide semiconductor (NMOS) device.

19. The apparatus according to claim 11, where the one or more functional circuitry components include logic gates.

20. A non-transitory computer-readable storage medium containing a first set of instructions, which when executed by a processor, allow the processor to:

command a control circuit, wherein the control circuit controls a plurality of execution lane circuits, wherein each execution lane includes one or more flops and one or more functional circuitry components in communication with the one or more flops;

selectively idle the one or more functional circuitry components of an inactive execution lane circuit during an instruction lane divergence, wherein the selectively idling includes sequentially idling the one or more functional circuitry components in the inactive execution lane circuit; and power-gate the selectively idled one or more functional circuitry components based upon either one of the following:

whether a number of instructions executed along a divergent path exceeds a predetermined threshold, or whether a time delay for extracting data from memory exceeds a predetermined threshold.

21. The non-transitory computer-readable storage medium of claim 20, further comprising applying a sleep vector to the inactive execution lane circuit.

22. The non-transitory computer-readable storage medium of claim 21, further comprising the processor sequentially idling groups of components in the inactive execution lane circuit.

23. The non-transitory computer-readable storage medium of claim 21, further comprising the processor re-enabling the one or more functional circuitry components of the inactive execution lane circuit upon the divergent instruction reconverging at a convergence point.

24. The non-transitory computer-readable storage medium of claim 21, further comprising the processor sequentially re-enabling the one or more functional circuit components in the inactive execution lane circuit.

25. The non-transitory computer-readable storage medium of claim 21, further comprising the processor sequentially re-enabling groups of components in the inactive execution lane circuit.

26. The non-transitory computer-readable storage medium according to claim 20, wherein the one or more functional circuitry components include at least one of a P-Metal oxide semiconductor (PMOS) device or an N-Metal oxide semiconductor (NMOS) device.

27. The non-transitory computer-readable storage medium according to claim 20, where the one or more functional circuitry components include logic gates.

* * * * *